(No Model.)

W. BAKER.
Hub Attaching Device.

No. 229,353. Patented June 29, 1880.

Witnesses:
P. C. Dietrich
Fred. G. Dietrich

Inventor:
Walter Baker
by Louis Bagger Jr.
Attorneys

UNITED STATES PATENT OFFICE.

WALTER BAKER, OF ILION, NEW YORK.

HUB-ATTACHING DEVICE.

SPECIFICATION forming part of Letters Patent No. 229,353, dated June 29, 1880.

Application filed March 19, 1880. (No model.)

*To all whom it may concern:*

Be it known that I, WALTER BAKER, of Ilion, in the county of Herkimer and State of New York, have invented certain new and useful Improvements in Axle-Boxes; and I do hereby declare that the following is a full, clear, and exact description of the invention, which will enable others skilled in the art to which it appertains to make and use the same, reference being had to the accompanying drawings, which form a part of this specification, and in which—

Figure 1:
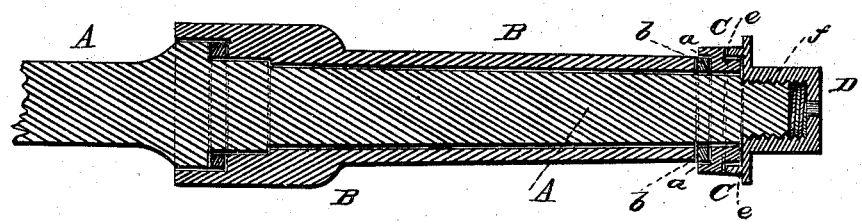
Figure 3:
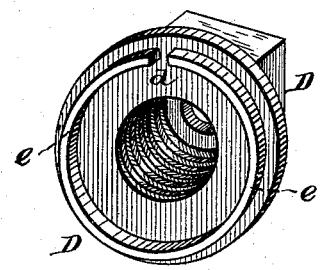
Figure 4:
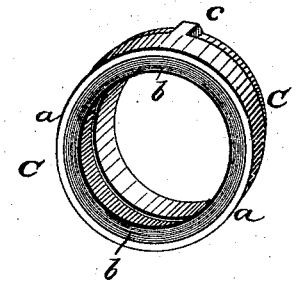
Figure 2:
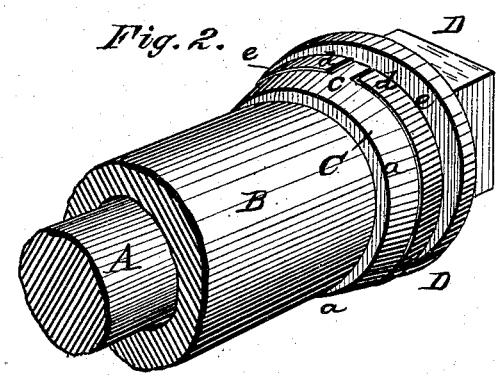

Figure 1 is a longitudinal section of a vehicle-axle box embodying my improvement. Fig. 2 is a perspective end view of the same. Fig. 3 is a perspective view of the nut detached, and Fig. 4 is a similar view of the annular cup or collar which is used in combination with and forms a part of my improvement.

Similar letters of reference indicate corresponding parts in all the figures.

My invention has relation to the axle-boxes of carriages and other vehicles; and it consists in the combination, with the spindle and axle-box, of an improved device for taking up the wear of the latter, substantially as hereinafter more fully described.

In the drawings, A is the spindle, which is screw-threaded at its end $f$ to receive a nut, as usual. B is the axle-box, which is somewhat shorter than the spindle, and impinges with its outer end upon a ring or, more properly speaking, an annular cup, C, made with an inwardly-projecting rim or flange, $a$, to receive one or more leather washers, $b$. The ring or cup C has a projecting lug, $c$, on one side, which fits into a notch or recess, $d$, cut into the annular flange $e$ of the nut D, so that when the nut is screwed up upon the thread $f$ of spindle A the annular cup C, with its washer or washers $b$, will be turned with it and brought up against the end of the box, as shown in Fig. 1 of the drawings, to take up wear as occasion requires.

The body of the annular cup or collar C, fitting within the annular flange $e$ of the nut D, will prevent displacement and form a close and compact joint between the axle-box, collar, and nut, preventing the ingress of dust or dirt.

By making the collar C a separate part from the nut it can easily be renewed whenever required, and without renewal of the nut.

Having thus described my invention, I claim and desire to secure by Letters Patent of the United States—

The combination, with the axle A and box B, of the cap or ring C, with a flange, $a$, fitting on or over a washer on the axle, and adapted to lap the box B, and having a second flange, $e$, and the nut D, with its flange fitting over the flange $e$ of the cap or ring C, and provided with a slot, $d$, into which fits a projection, $c$, of the ring C, substantially as and for the purpose set forth.

In testimony that I claim the foregoing as my own I have hereto affixed my signature in presence of two witnesses.

WALTER BAKER.

Witnesses:
 CHARLES R. DARBY,
 GEORGE C. HUTCHINS.